US012131860B2

(12) United States Patent
Mueller et al.

(10) Patent No.: US 12,131,860 B2
(45) Date of Patent: Oct. 29, 2024

(54) ARRANGEMENT AND METHOD FOR THE GRADUAL SHUTOFF OF POTENTIAL IN HIGH-VOLTAGE TECHNOLOGY

(71) Applicant: HSP HOCHSPANNUNGSGERÄTE GMBH, Troisdorf (DE)

(72) Inventors: Sebastian Mueller, Zapfendorf (DE); Udo Prucker, Schwaig (DE)

(73) Assignee: HSP Hochspannungsgeräte GmbH, Troisdorf (DE)

( * ) Notice: Subject to any disclaimer, the term of this patent is extended or adjusted under 35 U.S.C. 154(b) by 672 days.

(21) Appl. No.: 17/274,231

(22) PCT Filed: Aug. 8, 2019

(86) PCT No.: PCT/EP2019/071291
§ 371 (c)(1),
(2) Date: Mar. 8, 2021

(87) PCT Pub. No.: WO2020/048720
PCT Pub. Date: Mar. 12, 2020

(65) Prior Publication Data

US 2021/0313109 A1 Oct. 7, 2021

(30) Foreign Application Priority Data

Sep. 7, 2018 (DE) ..................... 10 2018 215 274.8

(51) Int. Cl.
*H02G 15/20* (2006.01)
*H01B 17/26* (2006.01)
(Continued)

(52) U.S. Cl.
CPC ......... *H01F 27/2885* (2013.01); *H01B 17/26* (2013.01); *H01F 27/32* (2013.01)

(58) Field of Classification Search
CPC ........... H02G 3/04; H02G 3/083; H02G 3/18; H02G 3/22; H02G 3/24; H02G 3/30;
(Continued)

(56) References Cited

U.S. PATENT DOCUMENTS 3,055,968 A 9/1962 Spiece
3,875,327 A 4/1975 Hildenbrand
(Continued)

FOREIGN PATENT DOCUMENTS

CA 3094803 A1 10/2019
CA 3146740 A1 1/2021
(Continued)

*Primary Examiner* — William H. Mayo, III
(74) *Attorney, Agent, or Firm* — Laurence A. Greenberg; Werner H. Stemer; Ralph E. Locher

(57) ABSTRACT

An arrangement and a method for the gradual shutoff of potential in high voltage technology. The arrangement has at least one armature body, an electrically insulating film, and electrically conductive regions. The electrically conductive regions are arranged between layers of the electrically insulating films, and at least parts of the electrically insulating film are arranged around the at least one armature body. The arrangement is used in direct current applications. Resistive compensation currents are reduced and/or avoided along the electrically insulating film, and/or by an armature body, which functions as a first gradual potential shutoff coating, and/or by way of the electrical contacting of the outermost electrically conductive region between layers of electrically insulating film via an electrical contact through an opening in the outer layer of the insulating film.

18 Claims, 3 Drawing Sheets

(51) Int. Cl.
*H01F 27/28* (2006.01)
*H01F 27/32* (2006.01)

(58) Field of Classification Search
CPC .......... H02G 3/36; H02G 15/34; H02G 15/20; B29C 41/20; H01B 3/52; H01B 9/06; H01B 13/0358; H01B 17/005; H01B 17/26; H01B 17/28; H01B 17/265; H01B 17/303; H01B 17/42; H01B 17/50; H01B 19/04
USPC .... 174/15.3, 28, 39, 30, 50.63, 31 R, 137 R, 174/137 G, 138 G, 142, 152 R, 153 R, 174/172, 650, 14 BH, DIG. 10; 439/39, 439/181, 371
See application file for complete search history.

(56) References Cited

U.S. PATENT DOCUMENTS

| | | | | | |
|---|---|---|---|---|---|
| 4,387,266 | A | | 6/1983 | Matthaeus | |
| 4,500,745 | A | | 2/1985 | Miggins | |
| 5,548,081 | A | * | 8/1996 | Rost | H01F 38/30 174/25 G |
| 6,150,613 | A | * | 11/2000 | Bergstrom | H01F 27/04 174/31 R |
| 8,969,729 | B2 | * | 3/2015 | Jahnel | H01B 17/26 174/650 |
| 9,947,442 | B2 | * | 4/2018 | Engels | H02G 3/083 |
| 2009/0288878 | A1 | * | 11/2009 | Rocks | H01B 17/265 174/665 |
| 2012/0071014 | A1 | * | 3/2012 | Dais | H01B 17/28 439/181 |
| 2021/0175007 | A1 | | 6/2021 | Baehr et al. | |

FOREIGN PATENT DOCUMENTS

| | | | | | |
|---|---|---|---|---|---|
| CH | 594964 | A5 | | 1/1978 | |
| DE | 2327629 | A1 | | 12/1974 | |
| DE | 3001810 | A1 | | 7/1981 | |
| DE | 0600233 | A1 | * | 10/1993 | H01B 17/28 |
| DE | 4240118 | C1 | | 3/1994 | |
| DE | 69024335 | T2 | | 8/1996 | |
| DE | 19547120 | A1 | | 6/1997 | |
| DE | 102012200408 | A1 | | 7/2013 | |
| DE | 102014004284 | A1 | | 10/2015 | |
| EP | 0600233 | A1 | | 6/1994 | |
| GB | 1464047 | | * | 1/1977 | G01R 19/00 |
| GB | 1464047 | A | | 2/1977 | |
| JP | 660143520 | A | | 7/1985 | |
| JP | H05274939 | A | | 10/1993 | |
| WO | 2009146570 | A1 | | 12/2009 | |
| WO | WO 2015/117823 | A1 | * | 8/2015 | H01B 17/28 |
| WO | 2021008799 | A1 | | 1/2021 | |

* cited by examiner

ARRANGEMENT AND METHOD FOR THE GRADUAL SHUTOFF OF POTENTIAL IN HIGH-VOLTAGE TECHNOLOGY

BACKGROUND OF THE INVENTION

Field of the Invention

The invention relates to an arrangement and a method for the gradual shutoff of potential in high-voltage technology, comprising at least one fitting body, electrically insulating film, and electrically conductive regions, wherein the electrically conductive regions are arranged between layers of the electrically insulating film, and at least parts of the electrically insulating film are arranged around the at least one fitting body.

In high-voltage technology, parts of outdoor installations that carry high voltage are electrically insulated from the ground potential by porcelain and/or composite insulators. In order to ensure the required dielectric strength of the insulating clearance, the potential between high voltage and ground potential is gradually shut off as homogeneously as possible, i.e. a uniform potential distribution is produced along the insulator. The gradual shutoff is effected by means of a control electrode at low voltage levels, a larger insulator diameter and/or larger designs additionally being required at higher voltage levels, associated with significantly higher use of material. This applies to AC applications, i.e. alternating-current voltage applications, and to DC applications, i.e. direct-current voltage applications, in particular in the high-voltage range of up to 550 kV and/or of up to 1200 kV. In the case of DC applications, the resistive potential distribution established is a determining factor here.

EP 0 600 233 A1 discloses a gradual shutoff which is effected by means of a few electrodes mechanically coupled to one another by insulating pieces. This electrode arrangement enables a coarsely controlled gradual shutoff.

Alternatively, a gradual shutoff of potential can be effected by means of an RIP, i.e. a resin impregnated paper, control. In that case, a multiplicity of aluminum coatings separated from one another by paper layers are wound cylindrically onto a former and impregnated with casting resin, thus giving rise to a solid resin cylinder. The resin cylinder, comprising aluminum coatings electrically insulated from one another by paper layers, forms the electrode arrangement.

In the case of DC applications, in contrast to AC applications, the potential distribution is determined by the resistive current established in the steady state. In the case of AC applications, by contrast, the potential distribution is determined by the capacitive distribution. Thus, with an identical arrangement, it is possible for different potential distributions and field loads to arise in the case of AC and DC loads.

SUMMARY OF THE INVENTION

It is an object of the present invention to specify an arrangement and a method for the gradual shutoff of potential in high-voltage technology which are suitable for AC and DC applications. In particular, it is an object to specify an arrangement for the gradual shutoff of potential which is suitable for AC applications and which is suitable in the same form for DC applications.

The object specified is achieved according to the invention by means of an arrangement for the gradual shutoff of potential in high-voltage technology having the features as claimed and/or by means of a method for the gradual shutoff of potential in high-voltage technology, in particular using the arrangement described above, as claimed. Advantageous configurations of the arrangement according to the invention for the gradual shutoff of potential in high-voltage technology and/or of the method for the gradual shutoff of potential in high-voltage technology, in particular using the arrangement described above, are specified in the dependent claims. In this case, subjects of the main claims are combinable among one another and with features of dependent claims, and features of the dependent claims are combinable among one another.

An arrangement according to the invention for the gradual shutoff of potential in high-voltage technology comprises at least one fitting body, electrically insulating film, and electrically conductive regions, wherein the electrically conductive regions are arranged between layers of the electrically insulating film. At least parts of the electrically insulating film are arranged around the at least one fitting body. The arrangement is configured for direct-current applications.

The requirements in respect of direct-current DC applications are higher than the requirements in respect of alternating-current AC applications. However, e.g. AC arrangements used as standard for the gradual shutoff of potential for a current/voltage level can be used as DC arrangements of a lower current/voltage level, in particular as arrangements for exactly one current/voltage level lower. As a result, development costs can be saved and production costs can be lowered by way of higher numbers produced.

The electrically conductive regions between layers of the electrically insulating film can be configured as gradual potential shutoff coatings. At least one fitting body can be configured as a first gradual potential shutoff coating. By using the fitting body as a first gradual potential shutoff coating, it is possible to save one gradual shutoff coating and to simplify the production of the arrangement. An electrical contacting of the fitting body is possible simply, stably and cost-effectively e.g. by way of an eye.

The arrangement can be configured in a rotationally symmetrical fashion, in particular in a circular-cylindrical fashion, with the at least one fitting body, in particular in the manner of a winding tube, arranged at a first end in the interior, and with a cylindrical cladding tube, in particular a slotted cladding tube, arranged at a second end on the exterior. The winding of the electrically insulating film with electrically conductive regions between layers of the electrically insulating film is possible in a simple manner in the case of rotationally symmetrical arrangements, without e.g. breaks at edges and/or corners.

The electrically insulating film can be wound at least partially around the at least one fitting body, with electrically conductive regions electrically insulated from one another by way of the film, wherein at least one electrical contact making contact with an electrically conductive region can be formed by way of an opening in an in particular outer layer of the film. Forming the at least one electrical contact making contact with an electrically conductive region by way of the opening in a layer of the film enables a simple, stable and cost-effective electrical contacting.

The at least one electrical contact can be formed by an electrically conductive film strip, in particular an aluminum film strip, which is led through the opening. This enables a simple, stable and cost-effective electrical contacting, without the risk of a contact breaking as a result of bending. In the prior art the contact is usually produced by way of the outer edge of a film layer, the contact being bent at the edge. This can result in breaks in the contact, in particular on account of the small thickness of the films.

A plurality of electrical contacts, in particular three, making contact with an electrically conductive region can be formed by way of openings in the outer layer of the film, in particular by way of three openings arranged offset respectively by 120 degrees relative to one another on a circumferential radius. This provides a good electrical contact, with a favorable field distribution.

The at least one electrical contact can be clamped between the electrically conductive region located furthest outward in a radial direction and the outer layer of the film with one opening, and/or can be led flat through the opening, and/or can be clamped between the outer layer of the film and the cladding tube, in particular can be led toward the outside by way of a respective slot in the cladding tube. In terms of production, clamping is simple to realize and inexpensive and this results in a contact having good electrical conductivity and mechanical stability in conjunction with close winding of the film.

The at least one electrical contact can be formed in the shape of a ribbon, and/or can be folded away on the exterior at an angle of substantially 45 degrees along the outer circumference of the cylindrical cladding tube, in particular can be arranged with a longitudinal direction running along a circular circumference of the cladding tube. An electrical contact formed in the shape of a ribbon can be clamped between a film in a simple manner, is mechanically stable without easily breaking and yields a large area for a good electrical conduction. Folding away at an angle of substantially 45 degrees enables external electrical contacting simply and cost-effectively, wherein a direction change in the longitudinal direction of the contact formed in the shape of a ribbon is produced by the folding away.

The film can comprise an electrically insulating polymer and/or paper, in particular impregnated with resin. This produces a good electrical insulation by way of the film. The fitting body and/or the cladding tube can be composed of an electrically conductive material, in particular metal, in particular copper, aluminum and/or steel. This enables a good electrical contact of the arrangement by way of the fitting body and/or the cladding tube.

The fitting body can comprise at least one electrical contact connection, in particular in the form of a socket, for connecting a ground potential.

The electrically conductive regions can be formed between layers of the electrically insulating film from a metallic coating of the film or an inserted metallic film, in particular with each conductive region having substantially the shape of a lateral surface of a cylinder between adjacent layers of the electrically insulating film, in particular in each case spatially offset relative to one another along the longitudinal axis of the arrangement. A metallic coating of the film or an inserted metallic film is able to be wound with the film in a simple manner and is cost-effective.

The arrangement can have for direct-current applications for a direct-current high voltage spatially the dimensions which are configured for an alternating-current high voltage of a higher level, in particular with dimensions for alternating-current high voltage exactly one alternating-current high voltage level higher. As a result, arrangements can be produced and used in greater numbers, without being separately developed and produced in small numbers for direct-current high voltages.

A method according to the invention for the homogeneous gradual shutoff of high-voltage potentials along at least one insulator using an arrangement described above comprises the fact that resistive compensation currents along the electrically insulating film are reduced and/or avoided, by means of design for higher voltage levels, and/or by means of a fitting body acting as a first gradual potential shutoff coating, and/or by means of the electrical contacting of the outermost electrically conductive region between layers of electrically insulating film by way of an electrical contact through an opening in the outer layer of the insulating film.

The advantages of the method according to the invention for the homogeneous gradual shutoff of high-voltage potentials along at least one insulator using an arrangement described above as claimed are analogous to the above-described advantages of the arrangement according to the invention for the gradual shutoff of potential in high-voltage technology as claimed in claim 1, and vice versa.

Hereinafter an exemplary embodiment of the invention is illustrated schematically in FIGS. 1 to 5 and described in greater detail below.

DETAILED DESCRIPTION OF THE INVENTION

Figure 1:
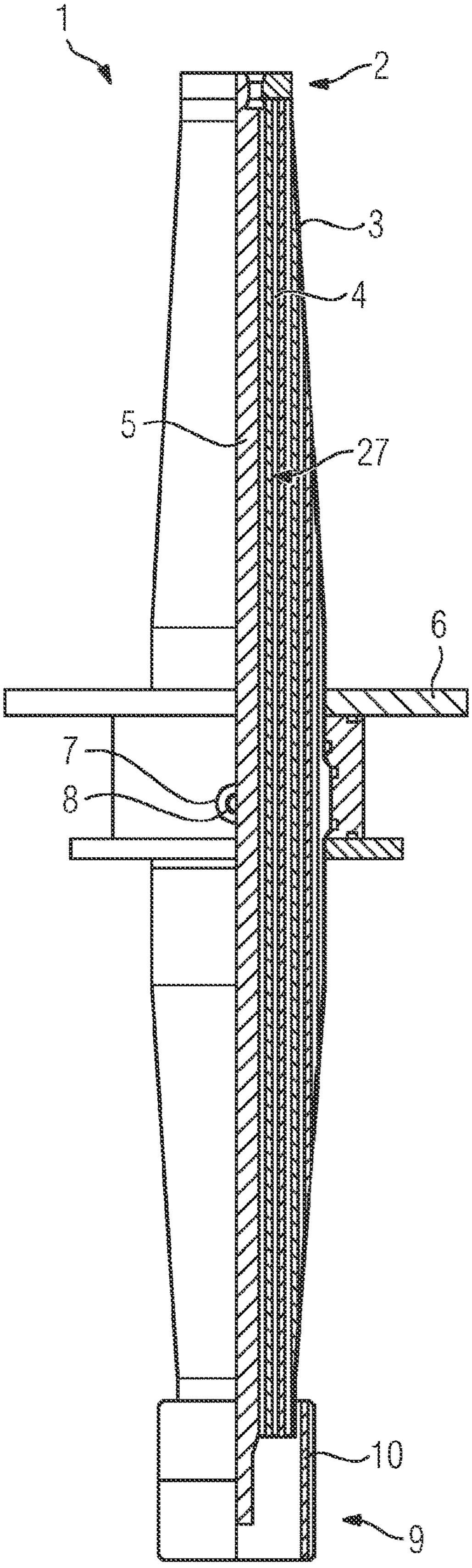
FIG. 1 schematically shows in partial sectional view an RIP, i.e. resin impregnated paper, bushing 1 as an outdoor installation in high-voltage technology with an arrangement 27 according to the invention for the gradual shutoff of potential, as viewed from a side, and FIG. 2 schematically shows in partial sectional view a high-voltage measuring transducer 11 as an outdoor installation with the arrangement 27 according to the invention for the gradual shutoff of potential, as viewed from a side, and FIG. 3 schematically shows in sectional view the ends of the arrangement 27 according to the invention with a fitting body 28 at one end and a cladding tube 32 at the other end of the arrangement 27 from FIG. 1, and FIG. 4 schematically shows the end with the fitting body 28 from FIG. 3 in an enlarged sectional view, and FIG. 5 schematically shows a part of the end with the cladding tube 32 from FIG. 3 in an enlarged sectional view.

FIG. 1 schematically illustrates in partial sectional view an RIP, i.e. a resin impregnated paper, bushing 1 for use in high-voltage technology, as viewed from a side. The bushing 1 comprises an arrangement 27 according to the invention for the gradual shutoff of potential for direct-current applications, in particular in 550 kV DC bushings. The bushing 1 is constructed in a cylindrical fashion or from two oppositely directed truncated cones, i.e. is configured in a rotationally symmetrical fashion with a longitudinal axis along a bar-shaped conductive pin 5, wherein the conductive pin 5 forms the longitudinal axis. The arrangement 27 according to the invention for the gradual shutoff of potential is arranged around the conductive pin 5 in particular in a positively locking manner. The conductive pin 5 is e.g. a cylindrical metal rod composed of copper, aluminum and/or steel.

The arrangement 27 according to the invention comprises an insulating body 3 composed of e.g. layers of an electrically insulating film wound around the conductive pin 5, said film comprising electrically conductive regions 4 between the layers. The electrically conductive regions 4 are configured as gradual potential shutoff coatings and are arranged e.g. offset relative to one another, along the longitudinal axis of the arrangement 27, in an overlapping manner between the layers of the insulating film. The electrically conductive regions 4 are formed e.g. as a metallic coating of the electrically insulating film or in each case as an inserted metallic film between layers of the insulating film. In this case, the electrically conductive regions 4 e.g. consist of and/or comprise an electrically conductive material, in particular a metal, e.g. copper, aluminum and/or steel. The electrically insulating film consists of and/or comprises paper, in particular a resin impregnated paper. Alternatively or additionally, electrically insulating polymers can be used as electrically insulating film.

The bushing 1 can be used e.g. for connecting transformers situated in a housing. Centrally along the longitudinal axis of the bushing 1, in the region in which the bushing 1 is led through the wall of the transformer housing, a flange 6 is arranged around the circumference of the arrangement 27 according to the invention. The flange 6 comprises e.g. a measurement connection 7 and an outlet valve 8, and seals off the inner region of the transformer housing, said inner region being filled with oil, for example, from the outer region, e.g. a gas or air region. One end of the bushing 1 comprises the gas-side connection 2 outside the transformer housing and the opposite end comprises the transformer-side connection 9. At the end of the transformer-side connection 9, an electrode 10 is arranged around the connection 9 in a ring-shaped manner.

Figure 2:
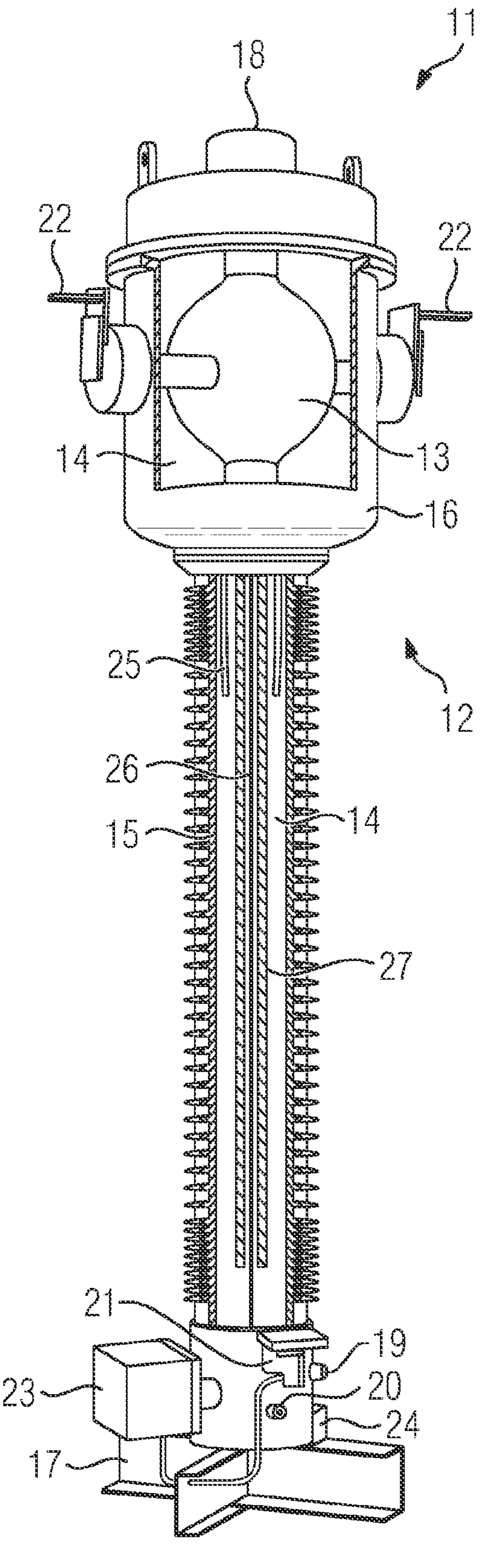

FIG. 2 schematically illustrates in partial sectional view a high-voltage measuring transducer 11 as an outdoor installation for use in high-voltage technology, as viewed from a side. The high-voltage measuring transducer 11 comprises a housing 12 with a support insulator 15 and a pressure vessel 16 and also the arrangement 27 according to the invention for the gradual shutoff of potential in direct-current applications, which arrangement projects from the pressure vessel 16 into the support insulator 15. A measuring device 13 of the high-voltage measuring transducer 11 is arranged in the pressure vessel 6. The measuring device 13 is configured to measure a DC current in the range of a few hundred to a few thousand amperes and/or to measure a voltage in the range of a few thousand volts, in particular in the range of 145 to 800 kV. The measuring device 13 is designed as a current and/or voltage converter, or as a combined converter.

In the exemplary embodiment in FIG. 2, the measuring device 13 comprises a current conductor arranged in the interior of the pressure vessel 16 and surrounded by a ring-shaped coil extending around the current conductor. Outside the pressure vessel 16, the current conductor is electrically connected via electrical connections 22 to an electrical power supply system, an electrical load and/or a power generating device. The measuring coil is connected via electrically insulated lines to a terminal box 23, in which measuring devices, sensors and/or data processing, data communication and/or data recording devices for measurement signals and the evaluation and/or communication thereof can be arranged or connected.

The pressure vessel 16 of the high-voltage measuring transducer 11 is arranged on the support insulator 15, which is embodied in a column-shaped fashion and is arranged upright, on a carrier 17. The carrier 17 comprises e.g. intersecting steel beams and is secured on a foundation, which is not illustrated in the figures for the sake of simplicity. The column-shaped support insulator 15 is secured by one end on the carrier 17, said end being sealed in a gastight fashion. At that end the terminal box 23 is secured to the column-shaped support insulator 15, and devices such as e.g. a filling connection 19, a test connection 20 and/or a sealtightness monitor 21 are arranged at that end.

The support insulator 15 and the pressure vessel 16 are filled e.g. with $SF_6$ and/or clean air as insulating gas 14 and are sealed in a gastight manner as a housing 12. Filling can be effected via the filling connection 19, and the sealtightness and the gas pressure in the interior can be checked via the test connection 20 and the sealtightness monitor 21. At the upper end of the column-shaped support insulator 15, the pressure vessel 16 is formed in the shape of a pot, arranged on the support insulator 15, with a bursting disk as overpressure device 18 at the upper end of the pressure vessel 16. In the event of a great increase in pressure of the insulating gas 14 in the housing 12, e.g. caused by heating by way of environmental influences, in particular insolation, by way of malfunctions or evolution of heat caused by large currents, an overpressure can be relieved upward out of the housing 12 by means of bursting of the bursting disk. This prevents e.g. an explosion of the support insulator 15 and/or of the pressure vessel 16, in the event of which flying pieces of debris could injure persons in the surroundings.

The pressure vessel 16 is formed e.g. from steel, cast iron and/or aluminum, with a wall thickness that withstands an insulating gas pressure of e.g. 6 to 15 bar with long-term stability. The wall thickness is e.g. in the range of from millimeters to centimeters. The column-shaped support insulator 15 is hollow in the interior, formed with a wall thickness that likewise withstands the insulating gas pressure of e.g. 6 to 15 bar with long-term stability and supports the weight of the pressure vessel 16 with the connection loads secured thereto. The support insulator 15 is composed e.g. of ceramic, silicone and/or of a composite material. The outer circumference of the support insulator has ring-shaped slats extending around the outer circumference, arranged at regular intervals along the longitudinal axis of the column-shaped support insulator 15. As a result, the creepage current path along the longitudinal axis of the column-shaped support insulator 15 is lengthened, and the external insulation effect of the support insulator 15 is improved.

In the interior of the column-shaped support insulator 15, a dissipating tube 26 for grounding the measuring device 13 is arranged along the longitudinal axis and a control electrode 25 is arranged rotationally symmetrically around the dissipating tube 26 in the upper region of the support insulator 15, in order to improve the field distribution in that region. The control electrode 25 and/or the dissipating tube 26 are/is formed in particular from metals having good electrical conductivity, such as e.g. copper and/or steel.

The arrangement 27 according to the invention for the gradual shutoff of potential is arranged in particular rotationally symmetrically around the dissipating tube 26. The arrangement 27 according to the invention extends along the longitudinal axis of the dissipating tube 26 and envelops the circumference of the dissipating tube 26. The arrangement 27 according to the invention extends from the pressurized gas vessel 16 into the support insulator 15 along the center axis of the support insulator 15. A gradual shutoff of potential from the high-voltage potential of the current conductor to ground potential in the region of the terminal box 23 is effected by means of the arrangement 27 according to the invention.

Figure 3:
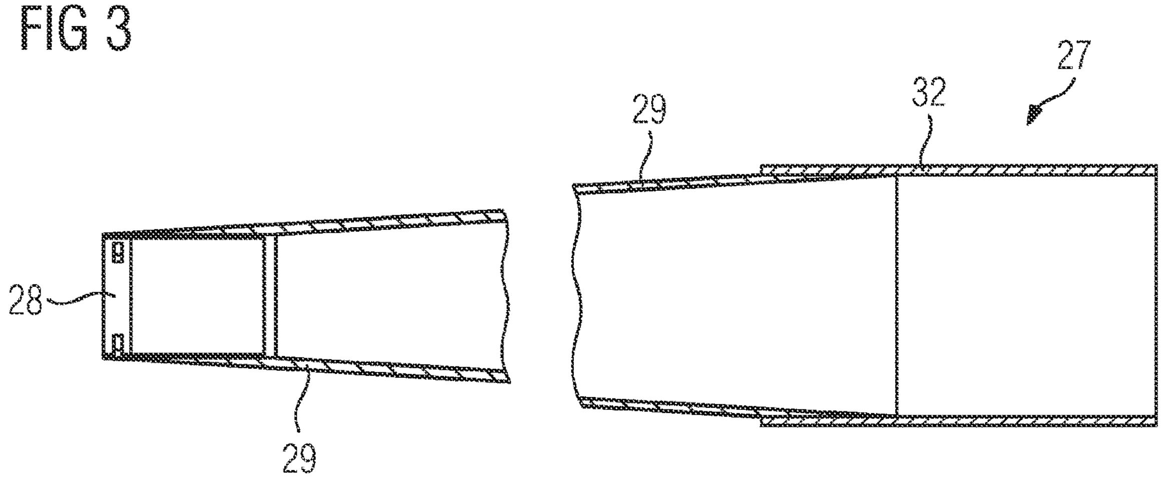

FIG. 3 schematically illustrates in an enlarged sectional view the ends of the arrangement 27 according to the invention from FIGS. 1 and 2. One end, i.e. the left end in FIG. 3, corresponds to the region of the end of the bushing 1 with the gas-side connection 2 in FIG. 1, and the second end, i.e. the right end in FIG. 3, corresponds to the region of the transformer-side connection 9 in FIG. 1. Said one end comprises a fitting body 28, which serves as a winding mandrel or winding tube and as a first gradual potential shutoff coating. The first layer of insulating film 29 is wound onto the fitting body 28 in particular in a positively locking manner. The second end in FIG. 3 comprises a cladding tube 32. The cladding tube 32 is pushed onto the last, outer layer of the insulating film 29 in particular in a positively locking manner.

Figure 4:
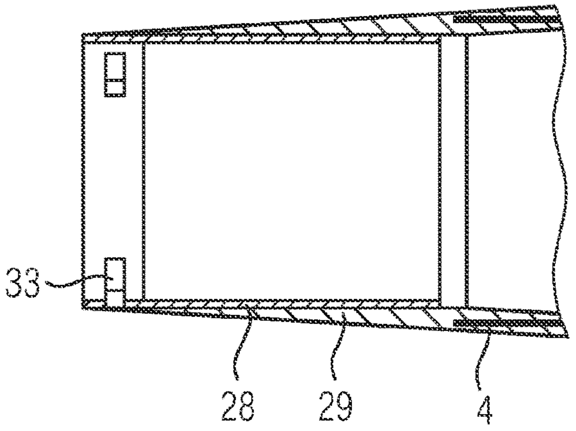

The inventive arrangement 27 is electrically contacted via the fitting body 28 and the cladding tube 32, and the potential is gradually shut off between the two ends of the arrangement 27 by way of the electrically conductive regions or control coatings 4 wound or arranged offset between the layers of insulating film 29. FIG. 4 shows the end of the inventive arrangement 27 with the fitting body 28 in detail in an enlarged view. The fitting body 28 comprises electrical contact connections 33, in particular in the form of eyes, for electrical contacting, e.g. with ground potential. Lines for electrical contacting can be e.g. clamped in the eyes and/or screwed thereto and/or soldered thereto. An overlap between the fitting body 28 as first control coating and a first inner electrically conductive region 4, or control coating, wound between the insulating film 29 is shown by way of example in FIG. 4. Further control coatings or electrically conductive regions 4 wound between the insulating film 29, which are not shown in FIG. 4, enable the gradual shutoff of potential over the entire length of the inventive arrangement 27.

Figure 5:
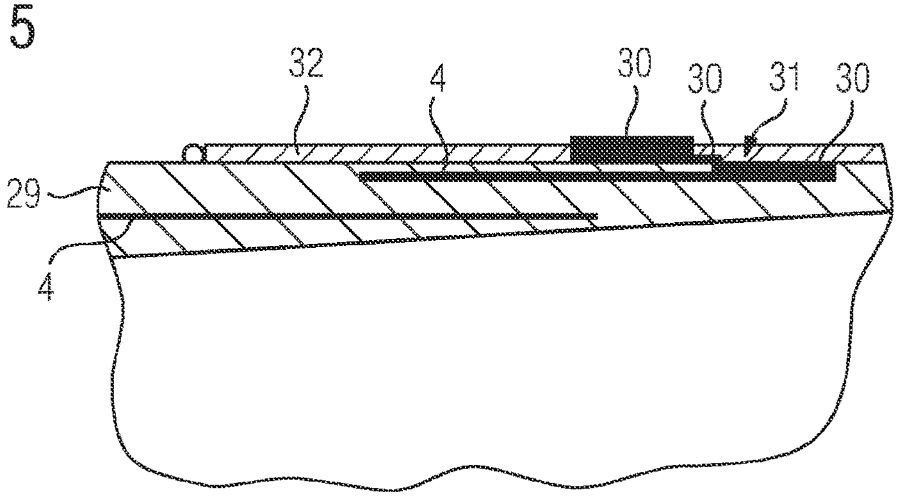

FIG. 5 illustrates an enlarged excerpt from the second end of the inventive arrangement 27, i.e. the right end in FIG. 3, which corresponds e.g. to the region of the transformer-side connection 9 in FIG. 1. The cladding tube 32 is arranged on the last, outer layer of the insulating film 29 in particular in a positively locking manner, in particular is pushed onto the layer of the film 29. A window or an opening 31 is made in the outer layer of the insulating film 29, through which window or opening an electrical contact 30 is led to the electrically conductive region 4 situated underneath. The contact 30 is produced e.g. by means of a conductive strip, in particular a flat conductor ribbon composed of aluminum, copper and/or steel, which is clamped between the electrically conductive region and the outer layer of the insulating film 29, is led through the opening 31 and is clamped between the cladding tube 32 and the outer layer of the insulating film 29.

The electrical contact 30, in particular in the form of the conductor strip or flat conductor ribbon, is led e.g. via continuous slots in the cladding tube 32 to the outer circumference of the inventive arrangement 27 and can be contacted toward the outside e.g. by clamping, soldering and/or screwing e.g. with electrical lines, in particular with high electrical potential. A plurality of slot arrangements, in particular three, arranged offset by in each case 120 degrees relative to one another along the outer circumference of the cladding tube 32, with respective openings 31 arranged in that region in the outer layer of the insulating film 29, can be formed in the arrangement 27 according to the invention. As a result, in each case by way of a slot arrangement and a conductor strip 30 led outward through the respective opening 31 and slot arrangement, the outer electrically conductive region 4 can be electrically contacted, i.e. the region 4 located furthest outward along the radius perpendicular to the longitudinal axis of the circular cross section of the arrangement 27. With three slot arrangements, assigned openings and conductor strips, it is possible to produce a good, stable electrical contact between the outer electrically conductive region 4 and e.g. electrical lines on the outer circumference of the inventive arrangement 27.

As is illustrated in FIG. 5 on the basis of the example of a further electrically conductive region 4, regions 4 radially succeeding one another in each case along the longitudinal axis of the arrangement 27 according to the invention overlap, in each case separated by in particular a layer of insulating film 29. The cladding tube 32 pushed onto the wound, alternating layers of insulating film 4 with intervening conductive regions 4 is embodied in a rounded fashion e.g. at the end facing in a direction toward the fitting body 28, in order to prevent an excessive increase in voltage at edges.

The exemplary embodiments described above can be combined among one another and/or can be combined with the prior art. In this regard, e.g. more or fewer than three slot arrangements arranged offset by 120 degrees, with respective openings 31 arranged in that region in the outer layer of the insulating film 29, can be formed in the arrangement 27 according to the invention. By way of example, one opening 31 and/or slot arrangement can be formed, or e.g. two openings 31 and/or slot arrangements situated radially opposite one another along the circular circumference of the arrangement 27 can be formed. The arrangement can also comprise four openings 31 and/or slot arrangements arranged offset in each case by 90 degrees relative to one another along the circular circumference. Instead of slot arrangements, openings e.g. of rectangular or square shape can also be provided in the cladding tube 32, a conductive strip 30 being led through said openings.

Conductive strips 30 can be led along the outer electrically conductive region 4, in a manner clamped by the outer layer of insulating film 29, along the longitudinal axis of the arrangement 27 according to the invention, can be led outward through the opening 30 in a manner folded by 45 degrees in a direction perpendicular to the longitudinal axis in the region of the opening and can be clamped by the cladding tube 32 and be led outward through a slot arrangement in the cladding tube 32 in a direction perpendicular to the longitudinal axis. Alternatively or additionally, as is shown e.g. in FIG. 5, conductive strips 30 can also be led along the outer electrically conductive region 4, in a manner clamped by the outer layer of insulating film 29, along the longitudinal axis of the arrangement 27 according to the invention, can be led outward through the opening 30 in a manner folded by 360 degrees in the opposite direction along the longitudinal axis in the region of the opening and, in a manner clamped by the cladding tube 32, arranged in a manner folded away by 45 degrees in a direction perpendicular to the longitudinal axis, can be led outward through a slot arrangement in the cladding tube 32. Other forms of folding and guiding the conductor strip 30, in particular depending on the shape and arrangement of the opening 31 in the outer layer of film 29 and the opening, in particular slot arrangement, in the cladding tube 32, are likewise possible.

Resistive compensation currents along the electrically insulating film 29 are avoided by means of the arrangement 27 according to the invention.

LIST OF REFERENCE SIGNS

1 RIP bushing
2 Gas-side connection
3 Insulating body
4 Control coatings/electrically conductive regions
5 Conductive pin
6 Flange
7 Measurement connection
8 Outlet valve
9 Transformer-side connection

10 Electrode
11 High-voltage measuring transducer
12 Housing
13 Measuring device, in particular current and/or voltage converter
14 Insulating gas
15 Support insulator
16 Pressurized gas vessel
17 Carrier
18 Overpressure device, in particular bursting disk
19 Filling connection
20 Test connection
21 Sealtightness monitor
22 Electrical connection
23 Terminal box
24 Grounding connection
25 Control electrode
26 Dissipating tube
27 Arrangement for the gradual shutoff of potential in high-voltage technology
28 Fitting body, in particular winding tube
29 Electrically insulating film
30 Electrical contact, in particular conductive strip
31 Opening in an outer layer of the film
32 Cladding tube, in particular with slot
33 Electrical contact connection, in particular for grounding

The invention claimed is:

1. An arrangement for a gradual shutoff of an electrical potential, the arrangement comprising:
- at least one fitting body;
- electrically insulating film having a plurality of layers;
- electrically conductive regions arranged between respective layers of said electrically insulating film; and
- at least portions of said electrically insulating film being arranged around said at least one fitting body;
- wherein said electrically insulating film is wound at least partially around said at least one fitting body, with said electrically conductive regions electrically insulated from one another by way of said film, and wherein at least one electrical contact making contact with one of said electrically conductive regions is formed by way of an opening in an outer layer of said film;
- wherein said at least one electrical contact is formed by an electrically conductive film strip, which is led through said opening; and
- wherein the arrangement of said at least one fitting body, said electrically insulating film, and said electrically conductive regions is configured for high-voltage direct-current applications.

2. The arrangement according to claim 1, wherein said electrically conductive regions between said layers of said electrically insulating film are configured as gradual potential shutoff coatings and said at least one fitting body is configured as a first gradual potential shutoff coating.

3. The arrangement according to claim 1, wherein the arrangement is rotationally symmetrical, with said at least one fitting body arranged at a first end in an interior, and with a cylindrical cladding tube arranged at a second end on an exterior.

4. The arrangement according to claim 3, wherein the arrangement is circular-cylindrical, said at least one fitting body is a winding tube, and said cylindrical cladding tube is a slotted cladding tube.

5. The arrangement according to claim 1, wherein a plurality of electrical contacts making contact with said electrically conductive regions are formed by way of openings in the outer layer of the film.

6. The arrangement according to claim 5, wherein said plurality of electrical contacts are three electrical contacts formed by way of said three openings arranged offset respectively by 120 degrees relative to one another in a circumferential direction.

7. The arrangement according to claim 1, wherein said at least one electrical contact is an aluminum strip.

8. The arrangement according to claim 1, wherein said at least one electrical contact has a shape of a ribbon, and/or said at least one electrical contact is folded away on an exterior at an angle of substantially 45 degrees along the outer circumference of the cylindrical cladding tube, in particular is arranged with a longitudinal direction running along a circular circumference of said cladding tube.

9. The arrangement according to claim 1, wherein said film comprises an electrically insulating polymer and/or paper, and/or one or both of said fitting body or said cladding tube are composed of an electrically conductive material.

10. The arrangement according to claim 9, wherein said paper is impregnated with resin, and said fitting body or said cladding tube are formed of metal selected from the group consisting of copper, aluminum, and steel.

11. The arrangement according to claim 1, wherein said fitting body comprises at least one electrical contact connection for connecting a ground potential.

12. The arrangement according to claim 11, wherein said at least one electrical contact connection is a socket.

13. The arrangement according to claim 1, wherein said electrically conductive regions are formed between layers of said electrically insulating film from a metallic coating of said film or an inserted metallic film and each said conductive region has substantially a shape of a lateral surface of a cylinder between adjacent layers of said electrically insulating film.

14. The arrangement according to claim 13, wherein said electrically conductive regions are spatially offset relative to one another along a longitudinal axis of the arrangement.

15. The arrangement according to claim 1, configured for direct-current applications for a direct-current high voltage with spatial dimensions that are designed for an alternating-current high voltage of a higher level.

16. The arrangement according to claim 15, wherein the spatial dimensions are designed for an alternating-current high voltage that is exactly one alternating-current high voltage level higher than the direct-current high voltage.

17. A method for the homogenous gradual shutoff of high-voltage potentials along an insulator, the method which comprises:
- providing an arrangement according to claim 1;
- reducing or avoiding resistive compensation currents along the electrically insulating film by at least one of the following:
  - designing the arrangement for higher voltage levels; and/or
  - forming the fitting body to acting as a first gradual potential shutoff coating; and/or
  - electrically contacting the outermost electrically conductive region between layers of electrically insulating film with an electrical contact through an opening in an outer layer of the insulating film.

18. An arrangement for a gradual shutoff of an electrical potential, the arrangement comprising:
- at least one fitting body;
- electrically insulating film having a plurality of layers;

electrically conductive regions arranged between respective layers of said electrically insulating film; and at least portions of said electrically insulating film being arranged around said at least one fitting body;

wherein the arrangement of said at least one fitting body, said electrically insulating film, and said electrically conductive regions is configured for high-voltage direct-current applications;

wherein said electrically insulating film is wound at least partially around said at least one fitting body, with said electrically conductive regions electrically insulated from one another by way of said film, and wherein at least one electrical contact making contact with one of said electrically conductive regions is formed by way of an opening in an outer layer of said film; and wherein said at least one electrical contact is clamped by said outer layer of said film between said electrically conductive region that is located farthest outward in a radial direction and said outer layer of said film with one opening, and/or said at least one electrical contact is clamped by said claddinq tube between said outer layer of said film and a cladding tube arranged at an end on an exterior of said electrically insulating film, and is led outwardly by way of a respective slot in said cladding tube.

* * * * *